United States Patent [19]
Takahashi et al.

[11] Patent Number: 6,156,998
[45] Date of Patent: Dec. 5, 2000

[54] CONTROL OF WELDING ARC LENGTH

[75] Inventors: Norihito Takahashi, Takatsuki; Waichi Nishikawa, Nishinomiya; Tomoyuki Ueyama, Taki-gun; Tuneo Takeda, Nishinomiya; Honjyun Tong, Takatsuki, all of Japan

[73] Assignee: Daihen Corporation, Osaka-fu, Japan

[21] Appl. No.: 09/280,875

[22] Filed: Mar. 29, 1999

[30] Foreign Application Priority Data

Mar. 31, 1998 [JP] Japan ................................. 10-105558

[51] Int. Cl.[7] ...................................................... B23K 9/09
[52] U.S. Cl. .............................. 219/130.21; 219/130.51; 219/137 PS
[58] Field of Search ........................ 219/130.21, 130.31, 219/130.32, 130.33, 130.51, 137 PS

[56] References Cited

U.S. PATENT DOCUMENTS

| | | |
|---|---|---|
| 3,632,960 | 1/1972 | Erdmann-Jesnitzer et al. ... 219/130.21 |
| 4,647,754 | 3/1987 | Hirasawa ............................ 219/130.21 |
| 4,697,062 | 9/1987 | Awano et al. ....................... 219/130.21 |
| 5,221,825 | 6/1993 | Siewert et al. ..................... 219/130.21 |
| 5,270,516 | 12/1993 | Hamamoto et al. ............... 219/130.21 |
| 5,756,967 | 5/1998 | Quinn et al. ....................... 219/130.21 |

FOREIGN PATENT DOCUMENTS

5-318118  12/1993  Japan .

*Primary Examiner*—Clifford C. Shaw
*Attorney, Agent, or Firm*—Scully, Scott, Murphy & Presser

[57] ABSTRACT

An arc length controlling method that is used in the practice of the pulsed welding in which welding is carried out by feeding an consumable electrode at a substantially constant speed while the pulse frequency f is set to a predetermined value. This method is carried out by effecting a welding after the counting time Tr and the target short-circuiting frequency Nr have been set, detecting the detected short-circuiting frequency Nk, and controlling the output voltage Vt to a value effective to allow the detected short-circuiting frequency Nk to be equal to the target short-circuiting frequency Nr.

3 Claims, 6 Drawing Sheets

CONTROL OF WELDING ARC LENGTH

BACKGROUND OF THE INVENTION

1. Field of the Invention

The present invention generally relates to the art of consumable electrode arc welding and, more particularly, to a method of controlling the apparent length of the welding arc between the workpiece and a consumable electrode to a constant value during the practice of the arc welding process.

2. Description of the Prior Art

To secure the stabilized high-quality weld during the practice of the consumable electrode arc welding, it has long been well known that the minimum mean distance La (which is hereinafter referred to as "apparent arc length") between the tip of a consumable welding wire and the workpiece has to be maintained at a constant value. It is also well known that in welding the workpiece made of aluminum or steel, weld defects such as undercuts and/or blowholes tend to occur if spray transfer of molten metal droplets is carried out with the welding arc of such a small length that no short-circuiting take place.

Figure 1A:
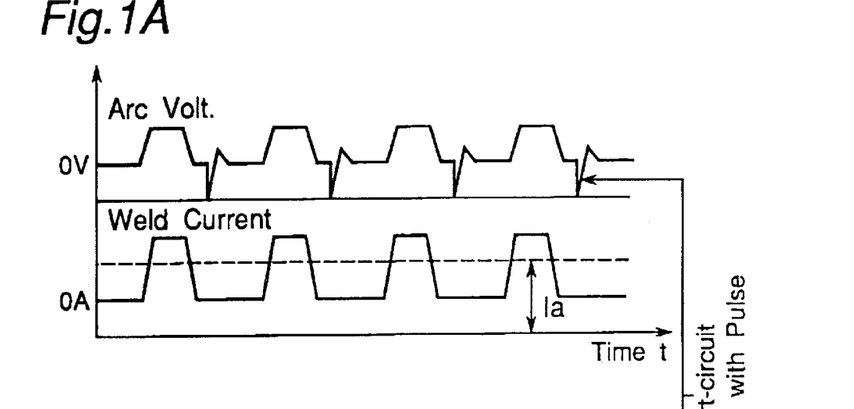
Figure 1B:
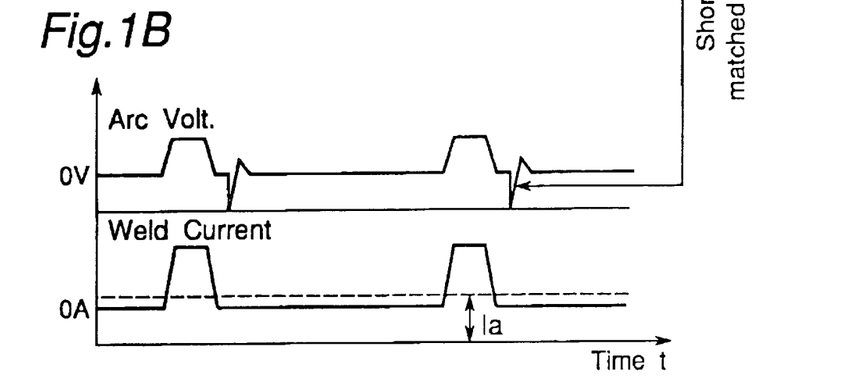

Accordingly, to avoid the weld defects such as discussed above, the welding method has hitherto been employed in which the welding is carried out by generating short-circuiting which is synchronized with the pulsing current at a proper arc voltage, but which is too minute to initiate metal transfer of molten metal droplets towards the workpiece. FIG. 1 illustrates diagrammatically welding situations in which the minute short-circuiting occur when the apparent arc length is controlled to a proper value. In the practice of the standard pulsed arc welding, the minute short-circuiting tends to occur in synchronism with metal transfer at a frequency matching with the pulse frequency f and, therefore, the number of short-circuits occurred (which number is hereinafter referred to as "short-circuiting frequency") is high at a large current region in which the pulse frequency f is high as shown in FIG. 1A, but is low at a small current region in which the pulse frequency f is low as shown in FIG. 1B.

As discussed above, change of the average welding current Ia tends to result in change of the pulse frequency and, hence the cycle of minute short-circuiting changes with change of the pulse frequency.

In view of the foregoing, the arc length controlling method has been employed in which in order to maintain the constant apparent arc length La, the output voltage Vt is controlled so that the short-circuiting frequency counted for a given length of time can attain a predetermined target value.

However, the prior art arc length controlling method has the following problems.

Figure 2:
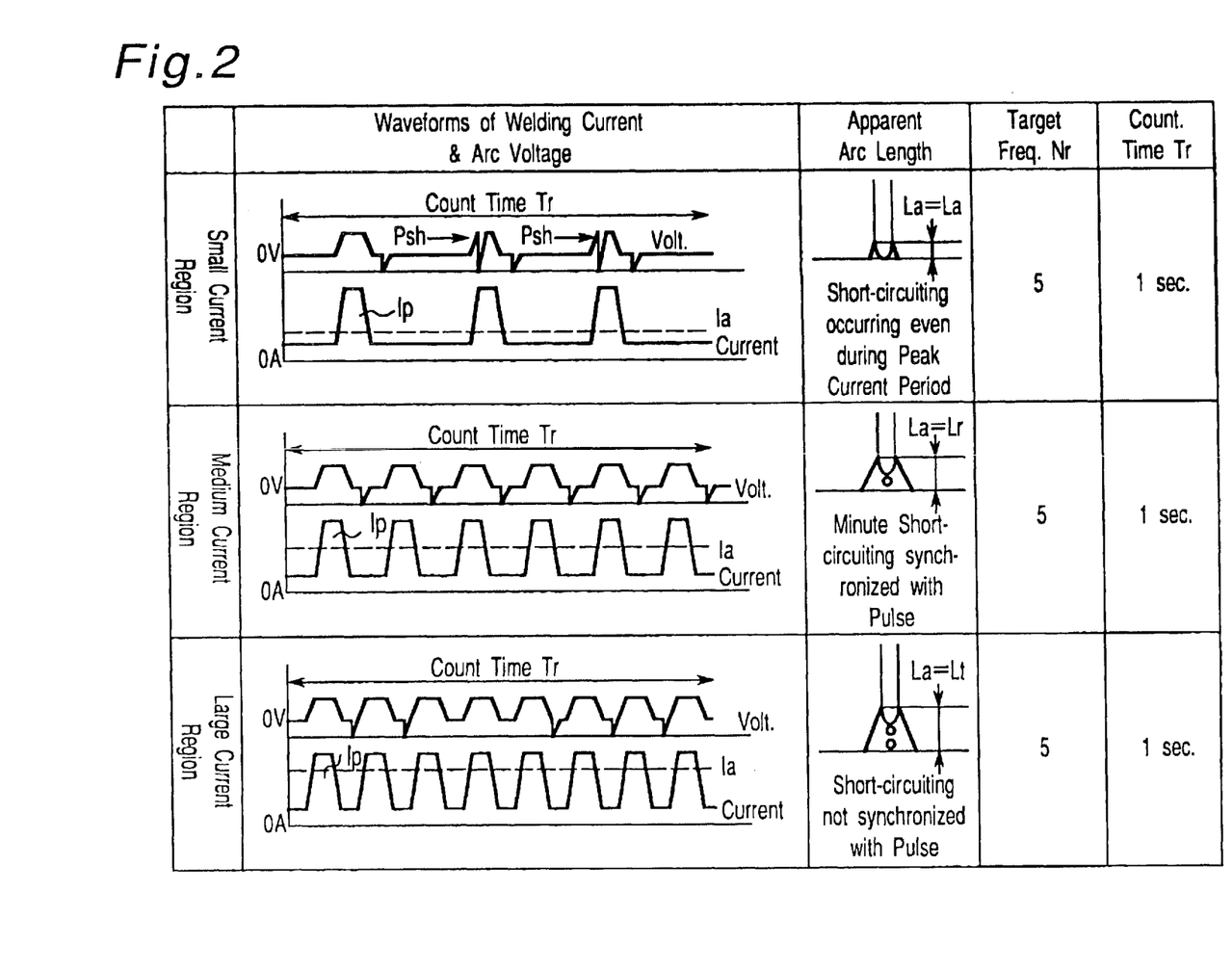
FIG. 2 is a comparison chart showing how the arc length La changes in each of small, medium and large current regions with change in arc voltage and welding current when the target short-circuiting cycle and the counting time are fixed to a predetermined value.

Referring to FIG. 2, a comparison chart is given to illustrate how the arc length La changes in each of small, medium and large current regions with change in arc voltage and welding current when the target or desired short-circuiting frequency Nr and the length of time (or, counting time) Tr during which the short-circuiting frequency is counted are fixed to a predetermined value. As shown therein, the counting time Tr and the target short-circuiting frequency Nr in each of the small, medium and large current regions are fixed to 1 second and 5 times, respectively.

The comparison chart of FIG. 2 will be described with particular reference to FIG. 6 which illustrates the relationship between the average welding current Ia and the arc length La which are exhibited when the welding is effected with the use of the prior art method and the arc length controlling method of the present invention, respectively.

When the welding current I is changed from 50A to 300A while the target short-circuiting frequency Nr and the counting time Tr are fixed at a predetermined value, the prior art method has resulted in that the apparent arc length La has considerably changed from 1.5 mm to 5.5 mm with change in welding current.

As shown in FIG. 2, the frequency of occurrence of the peak currents Ip during the counting time Tr and the frequency of occurrence of the minute short-circuiting Psh have the following relationship.

(1) In the small current region, the frequency of occurrence of the minute short-circuits is 5 while the frequency of occurrence of the peak currents is 3. Thus, in the small current region, the frequency of occurrence of the minute short-circuits is greater than the frequency of occurrence of the peak currents. This means that the apparent arc length La is small as shown by Ls.

(2) In the medium current region, the frequency of occurrence of the minute short-circuits is 5 while the frequency of occurrence of the peak currents is 5. Thus, in the small current region, the minute short-circuiting Psh occurs in synchronism with the peak current. This means that the apparent arc length La is of a proper value as shown by Lr.

(3) In the small current region, the frequency of occurrence of the minute short-circuits is 5 while the frequency of occurrence of the peak currents is 8. Thus, in the small current region, the frequency of occurrence of the minute short-circuits is smaller than the frequency of occurrence of the peak currents. This means that the apparent arc length La is long as shown by Lt.

For the reason discussed above, as shown in FIG. 6 in connection with the prior art, and in the small current region ranging from 50A to 100A, La<Lr; and in the large current region ranging from 250A to 300A, Lr<Lt. Thus, depending on the small to large current regions, the apparent arc length changes in the order of Ls<Lr<Lt.

In the practice of the prior art arc length controlling method, the output voltage Vt is so controlled that the short-circuiting frequency Nk counted during the fixed counting time Tr can attains a predetermined target value Nr. However, as discussed above, increase or decrease of the average welding current Ia with increase or decrease of the pulse frequency f tends to result in change of the apparent arc length and, therefore, in all of the small to large current regions, the apparent arc length La cannot be controlled to a proper value.

Figure 7A:
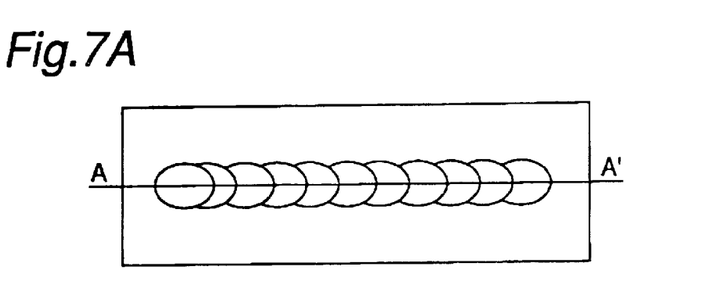
FIG. 7A is a top plan view of a workpiece having weld beads formed thereon.
Figure 7B:
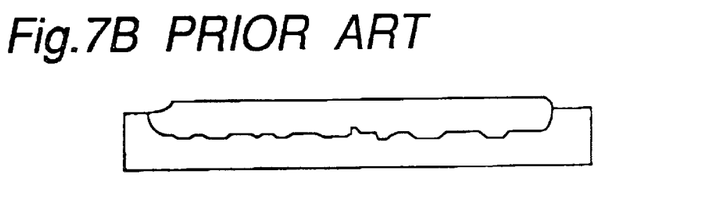
FIG. 7B is a schematic side sectional view showing a bead penetration formed with the prior art controlling method.

As shown in FIG. 7B, the prior art controlling method has resulted in insufficient bead penetration and weld defects such as undercuts and/or blowholes, which have occurred at the large current region.

SUMMARY OF THE INVENTION

Accordingly, the present invention has for its object to provide an improved arc length controlling method for controlling the apparent arc length to a proper value, in which the short-circuiting frequency which would be optimum for all current regions ranging from a small current region to a large current region is so determined that the output voltage Vt can be controlled so as to allow the frequency of occurrence Nk of short-circuiting which has been detected (hereinafter referred to as "actual or detected short-circuiting frequency") to attain a desired frequency of occurrence Nr of short-circuiting (which is hereinafter referred to as "target short-circuiting frequency").

To this end, one aspect of the present invention provides an arc length controlling method for controlling the apparent arc length to a proper value in a pulsed welding in which welding is carried out by feeding an consumable electrode at a substantially constant speed while the pulse frequency f that defines the average welding current Ia is set to a predetermined value. The arc length controlling method comprises effecting a welding after the counting time Tr and the target short-circuiting frequency Nr have been set, detecting the actual short-circuiting frequency Nk, and controlling the output voltage Vt to a value effective to allow the detected short-circuiting frequency Nk to be equal to the target short-circuiting frequency Nr to thereby control the apparent arc length to the proper value.

According to another aspect of the present invention, the arc length controlling method described above may be carried out by setting the counting time Tr and controlling the output voltage Vt to a value effective to allow the detected short-circuiting frequency Nk to be equal to the target short-circuiting frequency Nr to thereby control the apparent arc length to the proper value.

BRIEF DESCRIPTION OF THE DRAWINGS

The present invention will become readily understood from the following description of a preferred embodiment thereof made with reference to the accompanying drawings, in which like parts are designated by like reference numeral and in which:

FIG. 1A and 1B illustrate diagrammatically welding situations in which the minute short-circuiting occur when the apparent arc length is controlled to a proper value, wherein FIG. 1A illustrates the control at a large current region and FIG. 1B illustrates the control at a small current region;

DESCRIPTION OF THE EMBODIMENT

In general, the present invention is directed, as will be described in more detail with reference to FIG. 5, to a method of controlling the apparent arc length in the practice of a consumable electrode pulsed welding. Specifically, the apparent arc length La, that is, the minimum mean distance between the tip of the consumable welding wire and the workpiece is controlled to a proper value Lr by setting the counting time Tr, during which the short-circuiting frequency is counted, and the target short-circuiting frequency Nr required to render the apparent arc length La to be optimum, and controlling an output voltage Vt to a value effective to render the actual short-circuiting frequency Nk, that has been detected, to match with the target short-circuiting frequency Nr at any of small to large current regions.

Figure 3:
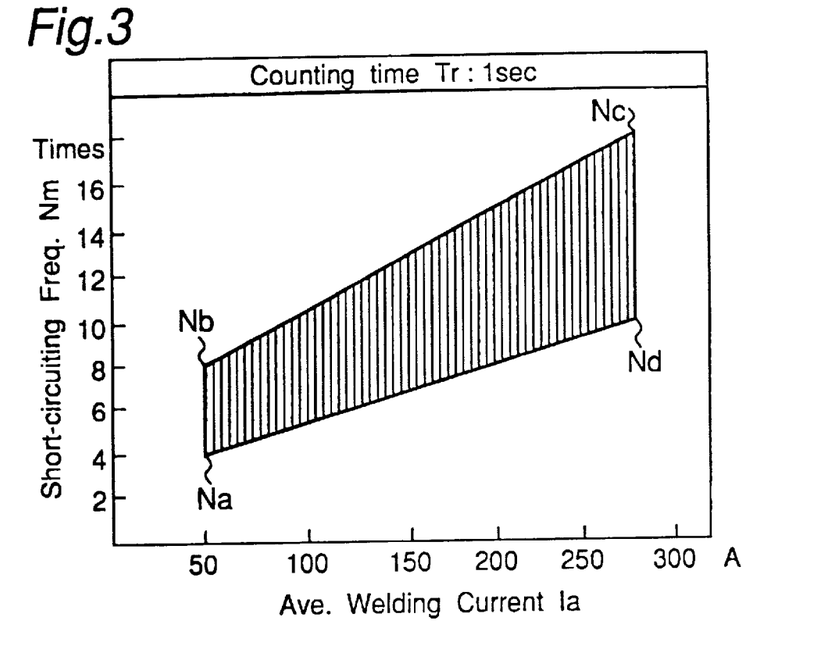
FIG. 3 is a chart showing the relationship between the average welding current Ia and the frequency of occurrence of short-circuiting at which the apparent arc length La attains the proper value.

FIG. 3 is a chart showing the relationship between the average welding current Ia and the optimum short-circuiting frequency Nm, that is, the frequency of occurrence of short-circuiting at which the apparent arc length La attains the proper value Lr. The result shown in the chart of FIG. 3 is obtained when the counting time Tr is set to 1 second with the optimum short-circuiting frequency Nm increasing with increase of the average welding current Ia. As shown therein, the optimum short-circuiting frequency Nm relative to the average welding current Ia has particular values encompassed within an area bound by points Na, Nb, Nc and Nd. For example, the optimum short-circuiting frequency Nm counted during the counting time Tr of 1 second when the average welding current Ia is about 50A is within the range of about 4 to 8 whereas that when the average welding current is about 270A is within the range of about 10 to about 18.

Figure 4:
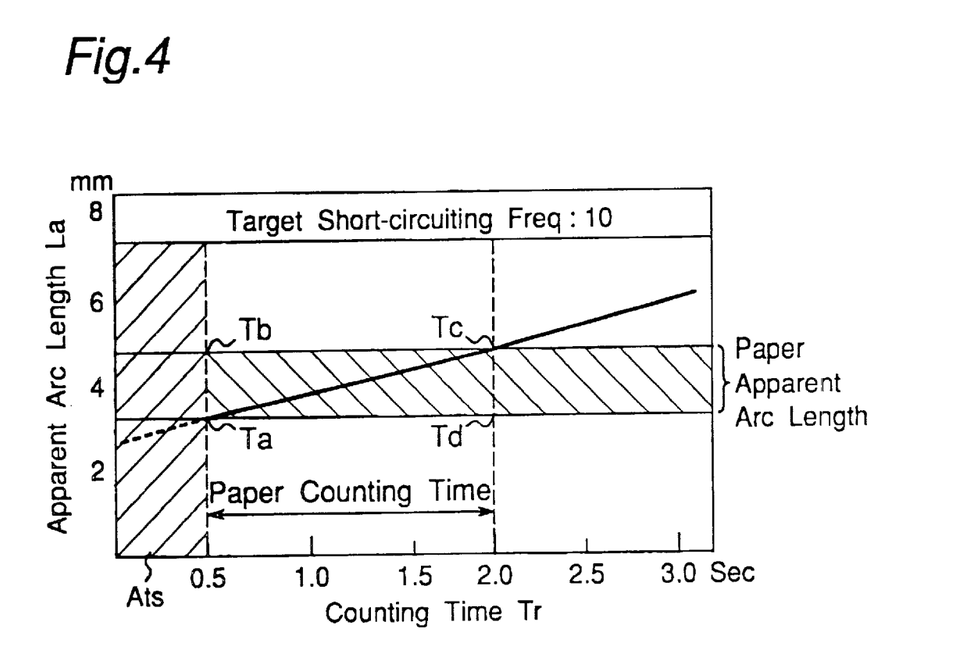
FIG. 4 is a chart showing the relationship between the counting time and the apparent arc length.

FIG. 4 is a chart showing the relationship between the counting time Tr and the apparent arc length La. As shown therein, if the counting time Tr is not longer than 0.5 second, the counting time Tr is too short to obtain required information and, therefore, the arc length is unstable and unable to be controlled as shown by a hatched area Ats. Conversely, if the counting time Tr is not shorter than 2.0 second, the sampling cycle is too long for the control to follow up quickly. Since in providing the result shown in the chart of FIG. 4 the target short-circuiting frequency Nr is fixed to 10, the proper apparent arc length Lr is within the range of 3 to 5 mm. Accordingly, the counting time Tr which is considered optimum to attain the proper apparent arc length Lr is within the range of 0.5 to 2.0 seconds as shown by a hatched area bound by points Ta, Tb, Tc and Td.

In other words, the chart of FIG. 4 speaks that assuming that the target short-circuiting frequency Nr is fixed to 10, the counting time Tr should be 0.5 second to secure the proper apparent arc length Lr of 3 mm or 2.0 seconds to secure the proper apparent arc length Lr of 5 mm.

From the respective charts of FIGS. 3 and 4, it has now become clear that to secure the proper apparent arc length Lr, the target short-circuiting frequency Nr and the counting time Tr should be set to respective proper values falling within the respective area bound by Na to Nd and Ta to Td.

Figure 5:
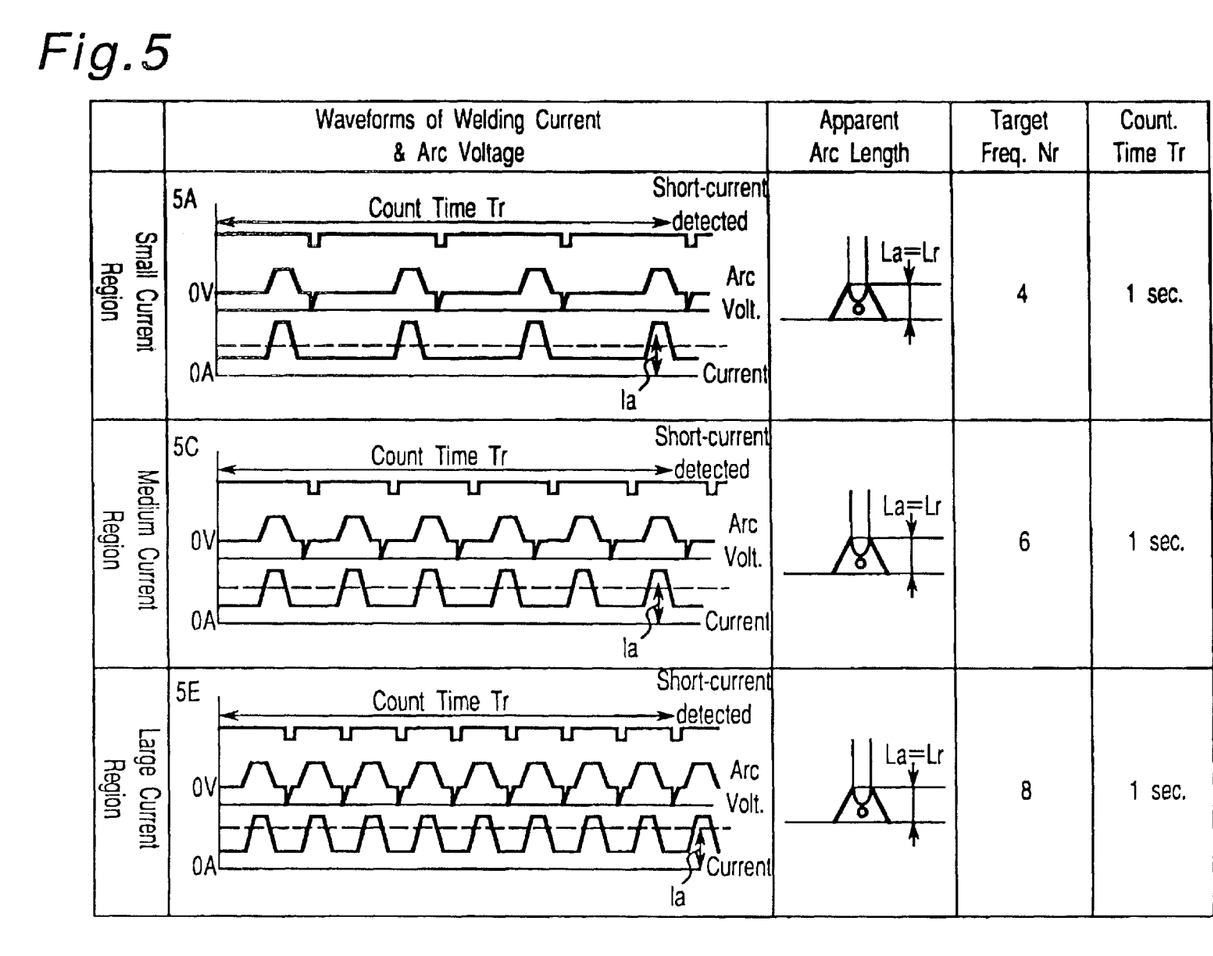
FIG. 5 is a comparison chart showing the change in arc voltage and welding current in relation to the apparent arc length which occurs when the output voltage is controlled to a value effective to allow the target short-circuiting frequency to correspond to the pulse frequency f.

FIG. 5 is a comparison chart showing the apparent arc length La and the cycle of change of each of the arc voltage and welding current which is exhibited when the counting time Tr in each of the small to large current regions is fixed to 1 second and the output voltage Vt is controlled to achieve the average welding current Ia or the target short-circuiting frequency Nr corresponding to the pulse frequency f which defines the average welding current Ia. As shown in a box 5A in FIG. 5, at the small current region in which the frequency is set low, since the target short-circuiting frequency Nr is set to 4 so as to fall within the hatched areas shown respectively in FIGS. 3 and 4, control of the output voltage Vt to a value effective to cause the short-circuiting to occur four times, i.e., to achieve the short-circuiting frequency being 4, results in the frequency of occurrence of the peak currents which is equal to the short-circuiting frequency. This means that as shown in a box 56 in FIG. 5 the apparent arc length La attains the proper apparent arc length Lr.

Similarly, as shown in a box 5C in FIG. 5, at the medium current region, since the target short-circuiting frequency Nr is set to 6 so as to fall within the hatched areas shown respectively in FIGS. 3 and 4, control of the output voltage Vt to a value effective to cause the short-circuiting to occur six times, i.e., to achieve the short-circuiting frequency being 6, results in the frequency of occurrence of the peak currents which is equal to the short-circuiting frequency. This means that as shown in a box 5D in FIG. 5 the apparent arc length La attains the proper apparent arc length Lr.

Again, as shown in a box 5E in FIG. 5, at the large current region in which the frequency is set high, since the target short-circuiting frequency Nr is set to 8 so as to fall within the hatched areas shown respectively in FIGS. 3 and 4, control of the output voltage Vt to a value effective to cause the short-circuiting to occur eight times, i.e., to achieve the short-circuiting frequency being 8, results in the frequency of occurrence of the peak currents which is equal to the short-circuiting frequency. This means that as shown in a box 5F in FIG. 5 the apparent arc length La attains the proper apparent arc length Lr.

Figure 6:
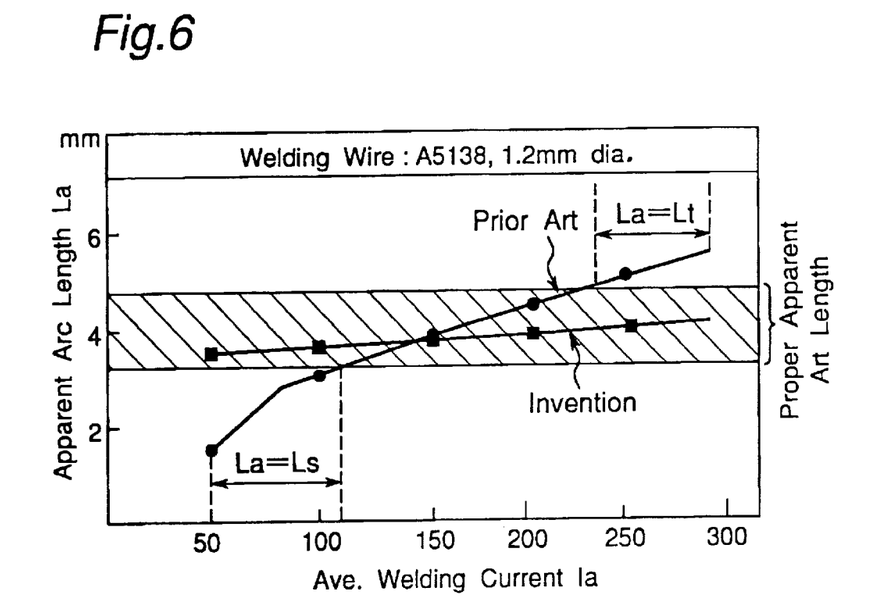
FIG. 6 illustrates the relationship between the average welding current and the arc length which are exhibited when the welding is effected with the use of the prior art method and the arc length controlling method of the present invention, respectively.

As hereinbefore referred to, FIG. 6 illustrates not only the relationship between the average welding current and the arc length which is exhibited when the welding is effected with the prior art method as hereinbefore referred to, but also that exhibited when the welding is effected with the method of the present invention. As shown therein, while with the prior art method, it has been difficult to control the apparent arc length La to the proper value Lr at any of the small and large current regions, the method of the present invention is effective to control the apparent arc length La to the proper value Lr at any of the small to large current regions.

Figure 7C:
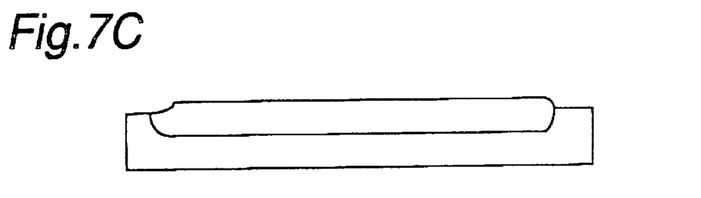
FIG. 7C is a schematic side sectional view showing the bead penetration formed with the controlling method of the present invention.

Also, as shown in FIG. 7C, with the method of the present invention, it has been demonstrated that the amount of bead penetration is substantially uniform over the welding line with no weld defect occurring therein, since the apparent arc length La has been controlled to the proper value Lr even at the large current region.

Figure 8:
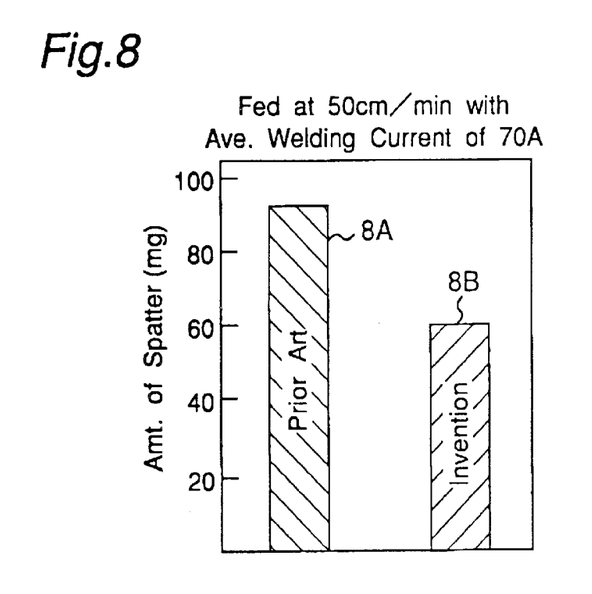
FIG. 8 is a chart showing a comparison between the prior art method and the method of the present invention as to the amount of spatter occurred during the welding operation.

FIG. 8 illustrates the amount of spatter occurred during the welding operation with the prior art method and that with the method of the present invention. When the welding is effected at a welding speed of 50 cm/m at the small current region in which the average welding current is 70A, the prior art method has resulted in 90 mg in amount of spatter as shown by a bar 8A in FIG. 8 whereas the method of the present invention has resulted in 60 mg in amount of spatter as shown by a bar 8B which is smaller than that exhibited by the prior art method.

In addition, if the counting time Tr is properly chosen and the output voltage Vt is controlled to a value effective to render the target short-circuiting frequency Nr to correspond to the average welding current Ia or the pulse frequency f, the apparent arc length La can be maintained at the proper value Lr regardless of the diameter and type of material of the welding wire (for example, 1.0 to 2.4 mm in diameter in the case of an aluminum allow or 0.8 to 1.6 mm in the case of steel or an nickel-based alloy or copper).

Figure 9:
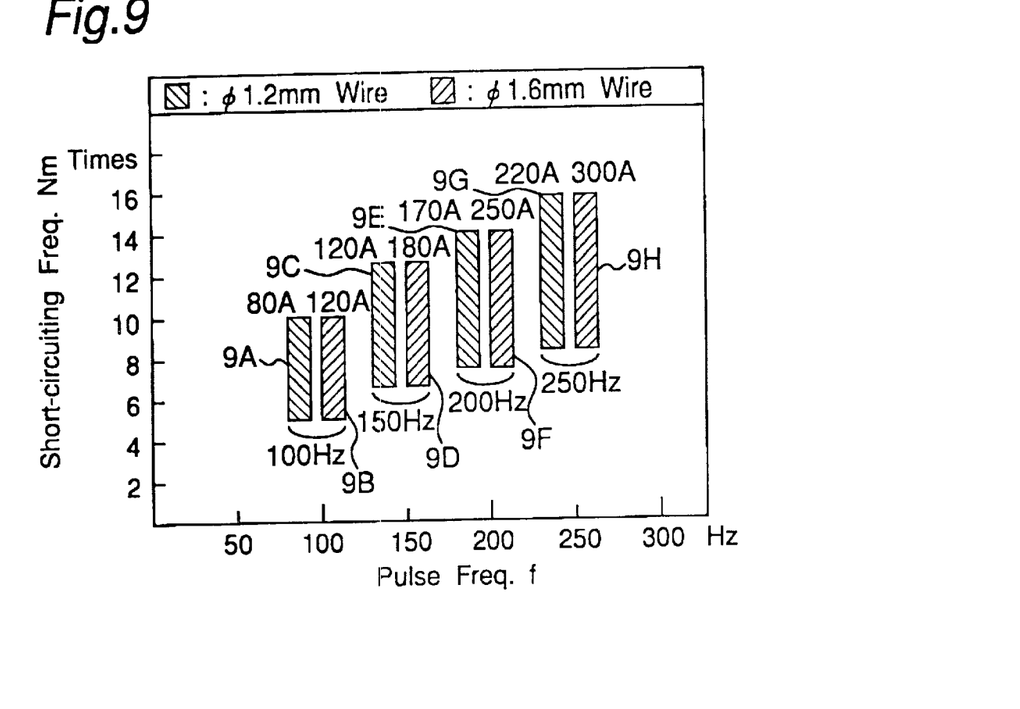
FIG. 9 is a chart showing the relationship between the pulse frequency and the frequency of occurrence of short-circuiting which is exhibited when the welding operation is carried out with the use of welding wires, 1.2 mm and 1.6 mm in diameter, respectively, both made of an Al-Mg alloy.

Specifically, FIG. 9 illustrates the relationship between the pulse frequency and the short-circuiting frequency which is exhibited when the welding operation is carried out with the use of welding wires, 1.2 mm and 1.6 mm in diameter, respectively, both made of an Al-Mg alloy. In FIG. 9, bars 9A and 9B represent the use of the welding wires of 1.2 mm and 1.6 mm in diameter. In this example, when the same frequency of 100 Hz is applied to the welding wires having the different diameters, the short-circuiting frequency that requires to renter the apparent arc length La to be of the proper value Lr is within the range of 5 to 10 in both cases, even though the average welding currents Ia for the 1.2 mm welding wire and that for the 1.6 mm welding wire are different, that is, 80A and 120A, respectively. Similarly, bars 9C and 9D represent the use of the welding wires of 1.2 mm and 1.6 mm in diameter, in which case when the same frequency of 150 Hz is applied to the welding wires having the different diameters, the short-circuiting frequency that requires to renter the apparent arc length La to be of the proper value Lr is within the range of 7 to 13 in both cases, even though the average welding currents Ia for the 1.2 mm welding wire and that for the 1.6 mm welding wire are different, that is, 120A and 180A, respectively Bars 9E and 9F represent the use of the welding wires of 1.2 mm and 1.6 mm in diameter, in which case when the same frequency of 200 Hz is applied to the welding wires having the different diameters, the short-circuiting frequency that requires to renter the apparent arc length La to be of the proper value Lr is within the range of 8 to 14 in both cases, even though the average welding currents Ia for the 1.2 mm welding wire and that for the 1.6 mm welding wire are different, that is, 170A and 250A, respectively.

Finally, bars 9G and 9H represent the use of the welding wires of 1.2 mm and 1.6 mm in diameter, in which case when the same frequency of 250 Hz is applied to the welding wires having the different diameters, the short-circuiting frequency that requires to renter the apparent arc length La to be of the proper value Lr is within the range of 9 to 16 in both cases, even though the average welding currents Ia for the 1.2 mm welding wire and that for the 1.6 mm welding wire are different, that is, 220A and 300A, respectively.

Thus, it is clear that if the frequency f defining the average welding current Ia is set to a proper value the proper short-circuiting frequency remains the same regardless of the diameter of the welding wire, and accordingly, FIG. 9 demonstrates the effectiveness of the method of the present invention.

Figure 10:
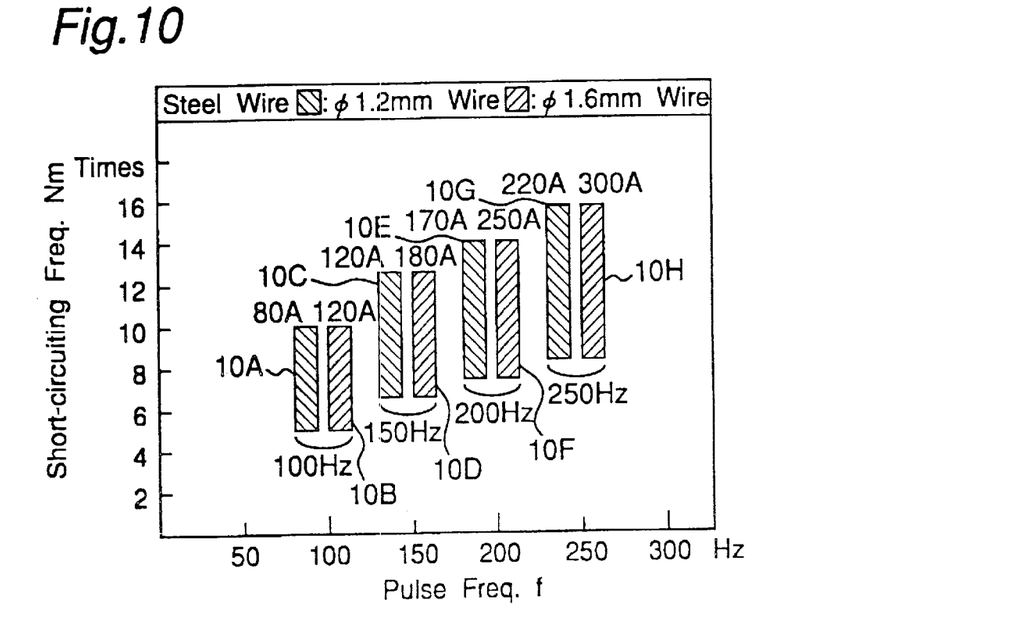
FIG. 10 is a chart showing the relationship between the pulse frequency and the short-circuiting frequency which is exhibited when the welding operation is carried out with the use of welding wires, 1.2 mm and 1.6 mm in diameter, respectively, both made of steel.

FIG. 10 illustrates the relationship between the pulse frequency and the short-circuiting frequency which is exhibited when the welding operation is carried out with the use of welding wires, 1.2 mm and 1.6 mm in diameter, respectively, both made of steel.

In FIG. 10, bars 10A and 10B represent the use of the welding wires of 1.2 mm and 1.6 mm in diameter. In this example, when the same frequency of 100 Hz is applied to the welding wires having the different diameters, the short-circuiting frequency that requires to renter the apparent arc length La to be of the proper value Lr is within the range of 5 to 10 in both cases, even though the average welding currents Ia for the 1.2 mm welding wire and that for the 1.6 mm welding wire are different, that is, 120A and 150A, respectively. Similarly, bars 10C and 10D represent the use of the welding wires of 1.2 mm and 1.6 mm in diameter, in which case when the same frequency of 150 Hz is applied to the welding wires having the different diameters, the short-circuiting frequency that requires to renter the apparent arc length La to be of the proper value Lr is within the range of 6 to 12 in both cases, even though the average welding currents Ia for the 1.2 mm welding wire and that for the 1.6 mm welding wire are different, that is, 170A and 200A, respectively.

Bars 10E and 10F represent the use of the welding wires of 1.2 mm and 1.6 mm in diameter, in which case when the same frequency of 200 Hz is applied to the welding wires having the different diameters, the short-circuiting frequency that requires to renter the apparent arc length La to be of the proper value Lr is within the range of 7 to 14 in both cases, even though the average welding currents Ia for the 1.2 mm welding wire and that for the 1.6 mm welding wire are different, that is, 230A and 280A, respectively.

Finally, bars 10G and 10H represent the use of the welding wires of 1.2 mm and 1.6 mm in diameter, in which case when the same frequency of 250 Hz is applied to the welding wires having the different diameters, the short-circuiting frequency that requires to renter the apparent arc length La to be of the proper value Lr is within the range of 9 to 16 in both cases, even though the average welding currents Ia for the 1.2 mm welding wire and that for the 1.6 mm welding wire are different, that is, 280A and 330A, respectively.

Thus, it is clear that if the frequency f defining the average welding current Ia is set to a proper value, the proper short-circuiting frequency remains the same regardless of the diameter of the welding wire, and accordingly, FIG. 10 demonstrates the effectiveness of the method of the present invention. In addition, FIGS. 9 and 10 demonstrate that with the method of the present invention the apparent arc length La can be controlled to the proper value Lr regardless of the type of material used for the welding wire.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A method of controlling an apparent arc length to a proper value in a pulsed welding which is carried out by feeding a consumable electrode at a substantially constant speed while a pulse frequency that defines an average welding current is set to a predetermined value, which method comprises the steps of:

effecting the welding by setting a counting time of a predetermined, substantially constant duration, during which a short-circuiting frequency is counted, and setting the value of the target frequency of occurrence of short circuiting on the basis of a known correspondence between the frequency of occurrence of short circuiting and the pulse frequency;

detecting the frequency of actual occurrence of short-circuiting during the counting time; and controlling an output voltage to a value effective to allow the detected short-circuiting frequency to be equal to the target short-circuiting frequency to thereby control the apparent arc length to the proper value.

2. A method of controlling an apparent arc length to a proper value in a pulsed welding which is carried out by feeding a consumable electrode at a substantially constant speed while a pulse frequency that defines an average welding current is set to a predetermined value, which method comprises the steps of:

effecting the welding by setting a target frequency of occurrence of short-circuiting, which is of a substantially constant value, and setting a counting time, during which a short-circuiting frequency is counted, so that the frequency of occurrence of short-circuiting determined on the basis of a known correspondence between the frequency of occurrence of short-circuiting and the pulse frequency attains a value equal to the target frequency of occurrence of short-circuiting;

detecting the frequency of actual occurrence of short-circuiting during the counting time; and controlling an output voltage to a value effective to allow a detected short-circuiting frequency to be equal to the target frequency of occurrence of the short-circuiting, to thereby control the apparent arc length to the proper value.

3. In a consumable electrode pulsed welding in which welding is carried out by feeding a consumable electrode at a constant speed along an intended weld line on a workpiece while a frequency of pulses that defines the average welding current is set to a predetermined value, a method for controlling the minimum mean distance between the tip of the consumable electrode and the workpiece, which method comprises the steps of:

effecting the welding by setting a counting time during which the frequency of occurrence of short-circuiting developed between the consumable electrode and the workpiece is counted and which correspond to setting of the pulse frequency and setting the value of the target frequency of occurrence of short circuiting on the basis of a known correspondence between the frequency of occurrence of short circuiting and the pulse frequency;

initiating the welding and detecting the frequency of actual occurrence of the short-circuiting during the welding;

detecting the frequency of actual occurrence of short-circuiting during the counting time; and controlling an output voltage to a value effective to allow the detected short-circuiting frequency to be equal to the target frequency of occurrence of the short-circuiting to thereby control the apparent arc length to a proper value.

* * * * *